(12) United States Patent
Krey et al.

(10) Patent No.: US 12,710,072 B2
(45) Date of Patent: Aug. 18, 2026

(54) WING FOR AN AIRCRAFT

(71) Applicant: Airbus Operations GmbH, Hamburg (DE)

(72) Inventors: Dennis Krey, Hamburg (DE); Steffen Kleemiß, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 18 days.

(21) Appl. No.: 18/770,202

(22) Filed: Jul. 11, 2024

(65) Prior Publication Data

US 2025/0020161 A1 Jan. 16, 2025

(30) Foreign Application Priority Data

Jul. 12, 2023 (EP) .................................... 23184996

(51) Int. Cl.
*B64C 9/24* (2006.01)
*B64C 9/02* (2006.01)
*F16C 23/08* (2006.01)

(52) U.S. Cl.
CPC .............. *F16C 23/086* (2013.01); *B64C 9/02* (2013.01); *B64C 9/24* (2013.01); *F16C 2326/43* (2013.01)

(58) Field of Classification Search
CPC . B64C 9/02; B64C 9/24; F16C 23/086; F16C 2326/43
See application file for complete search history.

(56) References Cited

U.S. PATENT DOCUMENTS 11,565,789 B2 1/2023 Schlipf et al.
2014/0339358 A1* 11/2014 Swartley ................ B64D 45/02 439/32

FOREIGN PATENT DOCUMENTS

WO 2021079250 A1 4/2021

OTHER PUBLICATIONS

Extended European Search Report including Written Opinion for Application No. 23184996.9 dated Dec. 11, 2023, pp. 1-7.

* cited by examiner

*Primary Examiner* — Kimberly S Berona
*Assistant Examiner* — Steven J Shur
(74) *Attorney, Agent, or Firm* — Lerner David LLP

(57) ABSTRACT

An aircraft wing includes a main wing and a high lift assembly having a high lift body, and a connection assembly movably connecting the high lift body to the main wing to be movable between a retracted and an extended position, and having an elongate track extending along a longitudinal axis between a first end and a second end. The first end of the track is mounted to the high lift body. The track is mounted to the main wing via a roller bearing to be movable along the longitudinal axis. The roller bearing includes a first and a second roller mounted to at least one of the main wing and the track via first and second eccentric connector assembly, respectively. The first and second eccentric connector assemblies are configured to be engaged simultaneously by a single alignment member for synchronous rigging of the first and second rollers.

20 Claims, 4 Drawing Sheets

WING FOR AN AIRCRAFT

FIELD OF THE INVENTION

The present invention relates to a wing for an aircraft. Further aspects of the invention relate to a high lift assembly for such a wing and an elongate track for a connection assembly of such a wing, as well as a roller bearing rigging system and a method for rigging a high lift assembly of the wing of an aircraft.

An aspect of the invention relates to a wing for an aircraft. The wing comprises a main wing, and a high lift assembly. The high lift assembly comprises a high lift body and a connection assembly movably connecting the high lift body to the main wing, such that the high lift body is movable between a retracted position and at least one extended position.

BACKGROUND OF THE INVENTION

The connection assembly comprises an elongate track which extends along a track longitudinal axis between a first end and a second end and has an intermediate portion between the first and second ends. The elongate track may have a curved or straight form along the track longitudinal axis. At least one, or both, of the first end and the intermediate portion of the elongate track is/are mounted to the high lift body.

The first end and/or the intermediate portion of the track is mounted to the high lift body and the track is mounted to the main wing via a roller bearing such that the track is movable along the track longitudinal axis. The front end may be the end positioned towards the intended direction of forward motion of the wing during flight of an aircraft. Alternatively, the first end may correspond to a rear end of the connection assembly, e.g. the end positioned away from the intended direction of forward motion of the wing during flight of an aircraft. Where the high lift body is or comprises a leading edge slat, then the first end may correspond to the front end of the connection assembly. Where the high lift body is or comprises a trailing edge flap, then the first end may correspond to the rear end of the connection assembly.

The first end of the elongate track may be preferably mounted to either a leading edge slat, or to a trailing edge flap by any appropriate means, e.g. by an arrangement of spherical bearings, preferably in a fixed manner with respect to a chord plane. The mounting of the elongate track to the main wing by a roller bearing may be such that the elongate track and either the leading edge slat or the trailing edge flap are moveable relative to the main wing. The elongate track may take the form of, for example, a C-shape, such that its surface lies opposite the circumferential surface of the roller bearing, wherein the distance between an upper surface and a lower surface of the elongate track is larger than a diameter of a roller bearing, such that the roller bearing may engage only one of the upper surface or the lower surface of the elongate track at any one time. I.e. the distance between the upper and lower surfaces of the elongate track is selected such that a clearance is provided between the roller bearing and either the upper surface or the lower surface of the elongate track, such that the roller bearing cannot engage with the upper and lower surfaces of the elongate track at the same time, thereby becoming wedged therein.

The roller bearing comprises at least one roller pair comprising a first and a second roller, each of the first and second roller being mounted to at least one of the main wing and the track via a respective first and second eccentric connector assembly. Each of the first and second rollers may have respective first and second rotation axes, and the first and second rotation axes may be coaxial. According to this aspect, the first and second eccentric connector assemblies are configured to be engaged simultaneously by a single member for synchronous rigging of the first and second rollers. The first and second eccentric connector assemblies may be configured to be engaged simultaneously by a common member for synchronous rigging of the first and second rollers.

BRIEF SUMMARY OF THE INVENTION

Wings for aircraft are known to comprise high lift assemblies having high lift bodies that are connected to the main wing by a connection assembly. One way of mounting the connection assembly to the main wing is via a roller assembly. In order to properly and accurately mount the connection assembly to the main wing, the roller assembly must be precisely rigged so as to provide the correct alignment of the high lift body with the wing. While manufacturing tolerances are desired to be as low as possible, cost and time restraints on the production of parts mean that the reduction of tolerances has a practical limit. The rigging process allows tolerances for parts to be relaxed to within a practical limit, while still providing a high degree of alignment between the high lift body and the wing. Where the roller assembly comprises more than one roller, the rollers must be individually rigged. This individual rigging can result in small misalignments between the rollers which may cause an uneven stress distribution between the rollers and/or may result in the jamming/premature degradation of the roller bearing.

Therefore, an aspect of the present invention relates to providing a non-complex connection assembly that permits accurate rigging of a plurality of rollers in a roller bearing.

According to an embodiment, the simultaneous engagement of the first and second connection assemblies by the alignment member enables synchronous rigging of the first and second rollers, thereby ensuring that the first and second rollers do not become accidentally misaligned during the rigging process. Preventing, or reducing as far as possible, the misalignment between the first and second rollers, may increase the lifespan of the first and second rollers due to a reduction in stress concentrations within the rollers. Rigging time may also be saved, as well as the costs of rigging the bearing, and the decreased need to replace the bearing due to more even distribution of wear.

According to one embodiment, the first and second eccentric connector assemblies may each comprise a respective first and second mounting portion for coupling to at least one of the main wing and the track and a respective first and second bearing portion for coupling to the respective first and second roller. The mounting portion may have a different diameter to the bearing portion. The mounting portion may be coupled to or integrally formed with the bearing portion. The mounting portion may be coupled to/engage with the at least one of the main wing and the track so as to enable rotation relative thereto. The mounting portion may engage the at least one of the main wing and the track by any appropriate means. For example, the mounting portion may be located, e.g. at least partially located, in an aperture in the at least one of the main wing and the track. The mounting portion may be held relative to the at least one of the main wing and the track by a nut and washer arrangement, and the mounting portion may comprise a threaded portion to enable mounting of a nut and washer relative thereto.

At least a part, or the whole, of each mounting portion may be rotatable about a respective first and second connector rotation axis relative to at least one of the main wing and the track, and each of the first and second roller may be rotatable about a respective first and second roller rotation axis relative to the respective bearing portion. Each of the first and second connector rotation axis may be offset from the respective roller rotation axis such that engagement and rotation, by an alignment member, of the first and second mounting portions about the respective connector rotation axis may effect corresponding rotation of the respective roller rotation axis about the connector rotation axis and synchronous rigging of the first and second rollers.

The first and second connection assemblies may each comprise an elongate connector, a mounting sleeve (e.g. in the form of a bushing) located on the elongate connector to define the mounting portion and a bearing sleeve (e.g. in the form of a bushing) located on the elongate connector to define the bearing portion. The mounting sleeve may be axially offset along the elongate connector from the bearing sleeve. In other words, the longitudinal axis of the mounting sleeve and bearing sleeve (both of which may be substantially cylindrical in shape) may be offset (e.g. not coaxial) and optionally parallel.

The length (e.g. the section) of elongate connector defining the mounting portion may comprise a different diameter than the length (e.g. section) of elongate connector defining the bearing portion. The length of elongate connector defining the mounting portion may comprise a larger diameter than the length of elongate connector defining the bearing portion.

The mounting sleeve may have a different diameter (e.g. a greater diameter or a smaller diameter) to the bearing sleeve. Where the mounting sleeve has a diameter that is different than that of the bearing sleeve, the elongate connector may have a constant diameter along its length, e.g. its entire length. The thickness of the mounting sleeve may be different to the thickness of the bearing sleeve, for example a section such as a circumferentially extending section of one of the mounting sleeve and the bearing sleeve may be different (e.g. thicker) than the other of the mounting sleeve and the bearing sleeve. Where one sleeve is thicker, or comprises a thicker portion, the elongate connector may comprise a longitudinal axis that is offset (e.g. offset and parallel) to the offset of the sleeve having the thicker portion, such that it is non-coaxially disposed relative to the sleeve, and/or extends non-coaxially therethrough, and optionally is disposed coaxially relative to, or extends coaxially through, the other sleeve. Each of the first and second connector rotation axes may be parallel to and radially offset from the respective roller rotation axis.

Each of the first and second eccentric connector assemblies may comprise a respective first and second throughbore. The first throughbore may be configurable to be aligned with the second throughbore such that an alignment member is locatable within the first throughbore and extends therefrom and into the second throughbore. As such, the alignment member may be used to reconfigure synchronously and/or simultaneously both the first and second eccentric connector assemblies. Rotation of the alignment member may result in rotation of the both the first and second eccentric connector assemblies. Rotation of the alignment member may cause rotation of the roller rotation axis about the connector rotation axis for each of the first and second connection assemblies. Rotation of the roller rotation axis about the connector rotation axis may enable and/or assist rigging of the first and second rollers.

The alignment member may be an alignment key. The alignment key may be removed from the first and second eccentric connector assemblies after a rigging process has been completed. The alignment key may comprise a handle and an elongate section for locating in the first and second throughbores. The handle may be rotatable directly by a user (e.g. by the hand of a user) or by a machine which may be configured to grip the handle.

The throughbore of each or both first and second eccentric connector assemblies may be concentric with either the mounting portion or the bearing portion. The longitudinal axis of the throughbore may be coaxial with the connector rotation axis or the roller axis. The longitudinal axis of the throughbore may be coaxial with whichever has the smaller diameter of the mounting portion or the bearing portion.

The elongate track may have an I-shaped, or double T-shaped, cross sectional shape.

An aspect relates to an elongate track for a connection assembly of a wing in line with the previous text. Where the elongate track at least one of: comprises a first and a second engagement surface configurable to engage a respective first and second surface of a first and second roller comprising a respective first and second eccentric connector assembly, and is configurable to mount a first and second roller comprising a first and second eccentric connector assembly thereto. The elongate track defines passage for permitting an alignment member to simultaneously engage both a first eccentric connector assembly and a second eccentric connector assembly so as to enable synchronous rigging of a first and second roller relative to the track.

The elongate track may comprise two flanges connected by a web. The passage may be at least partially defined in or by the web. The alignment member may therefore extend through the track.

A further aspect relates to a high lift assembly for the wing according that previously described. The high lift assembly comprises a high lift body, and a connection assembly configurable to movably connect the high lift body to a main wing of an aircraft, such that the high lift body is movable between a retracted position and at least one extended position. The connection assembly comprises an elongate track which extends along a track longitudinal axis between a first end and a second end and has an intermediate portion between the first and second ends. The first end and/or the intermediate portion of the track is mounted to the high lift body, and the track is configurable to be mounted to a main wing of an aircraft via a roller bearing such that the track is movable along the track longitudinal axis. The roller bearing may comprise at least one roller pair comprising a first and a second roller, each of the first and second roller being configurable to be mounted to at least one of the main wing and the track via a respective first and second eccentric connector assembly. The first and second roller may have coaxial rotation axes. The first and second eccentric connector assemblies are configured to be engaged simultaneously by a single alignment member for synchronous rigging of the first and second rollers. The first and second eccentric connector assemblies may be configured to be engaged by a common alignment member for synchronous rigging of the first and second rollers.

Another aspect relates to a roller bearing rigging system for a high lift assembly comprising a first and second eccentric connector assembly configurable to mount a roller to at least one of a main wing of an aircraft and a track of a connection assembly, wherein the first and second eccentric connector assemblies are configured to be engaged simultaneously be a single alignment member for synchronous rigging of the first and second rollers. As in previous aspects, the alignment member may be a common alignment member to the first and second eccentric connector assemblies.

Yet another aspect relates to a method for rigging a high lift assembly of the wing of an aircraft, the comprising providing a wing of an aircraft as previously described, simultaneously engaging an alignment member with both the first and the second eccentric connector assembly and synchronously rotating the first connection assembly and the second connection assembly to rig the roller bearing relative to the elongate track.

One aspect relates to an aircraft comprising a wing as previously described, and comprising a high lift assembly also as previously described.

DETAILED DESCRIPTION

Figure 1:
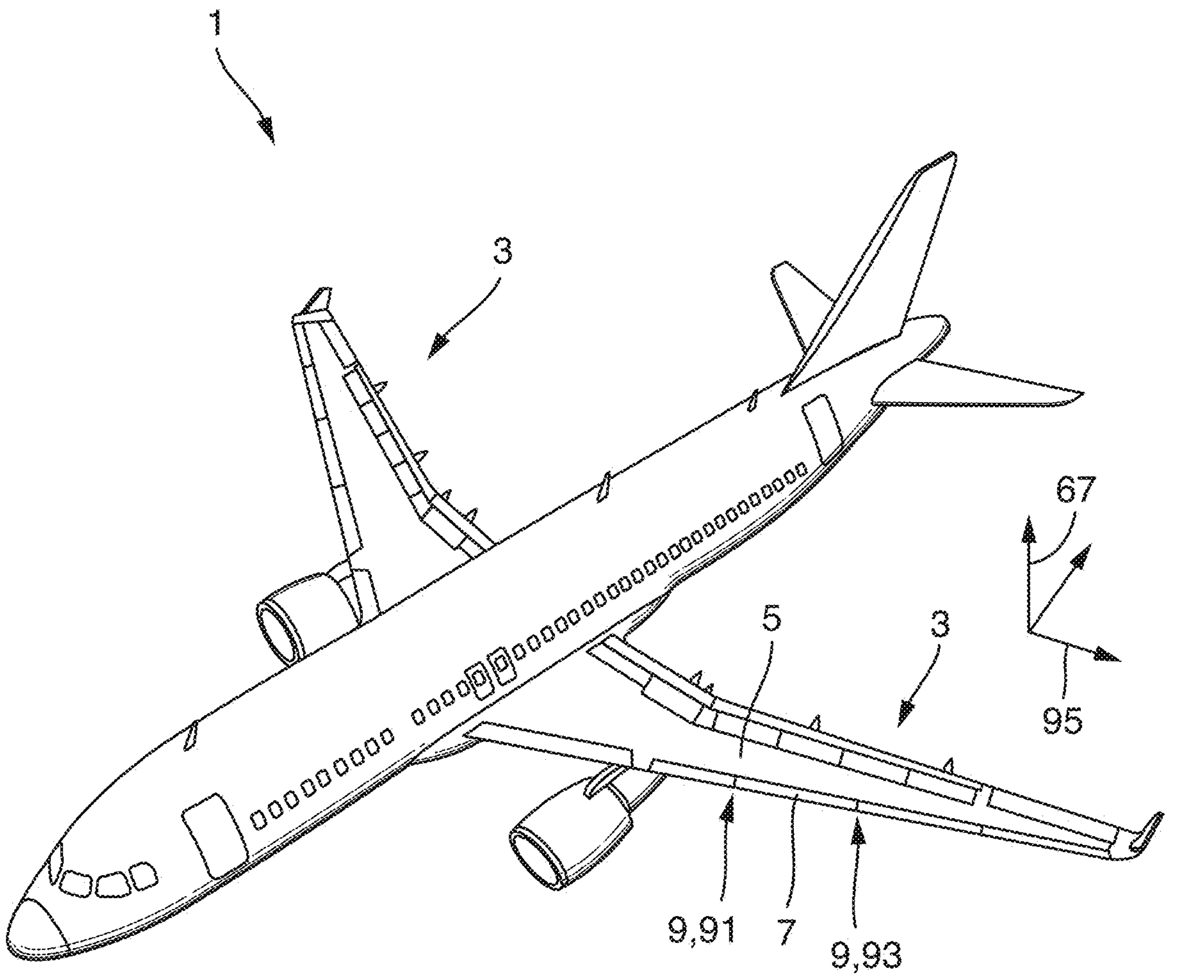
FIG. 1 is a perspective view of an aircraft, showing a wing of the aircraft.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting slat 7 to the main wing 5, it should also be understood that the connection assembly 9 may be used to connect a trailing edge flap 2 to the wing 5 of an aircraft.

Figure 2A:
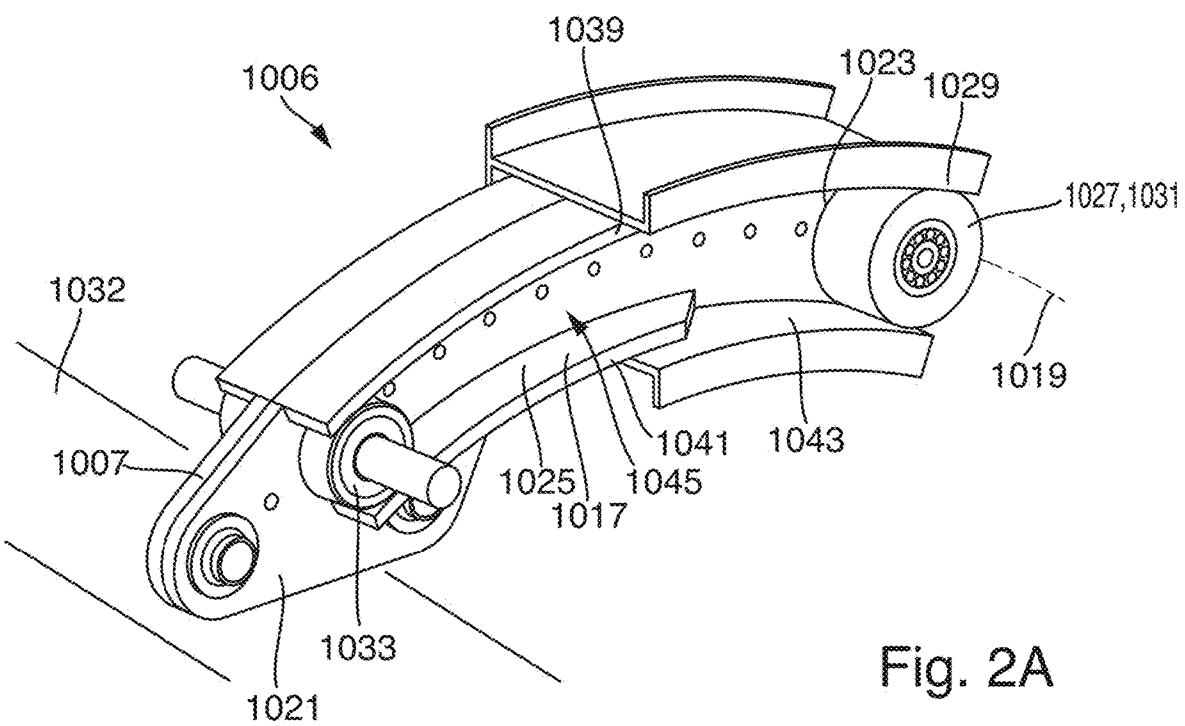
FIGS. 2A and 2B are connection assemblies according to the prior art.

FIG. 2A shows a connection assembly 1006 of a wing for an aircraft according to the prior art which is configured to connect a high lift body 1032 (in this case a slat) to the main wing of an aircraft. The connection assembly 1006 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position.

Figure 2B:
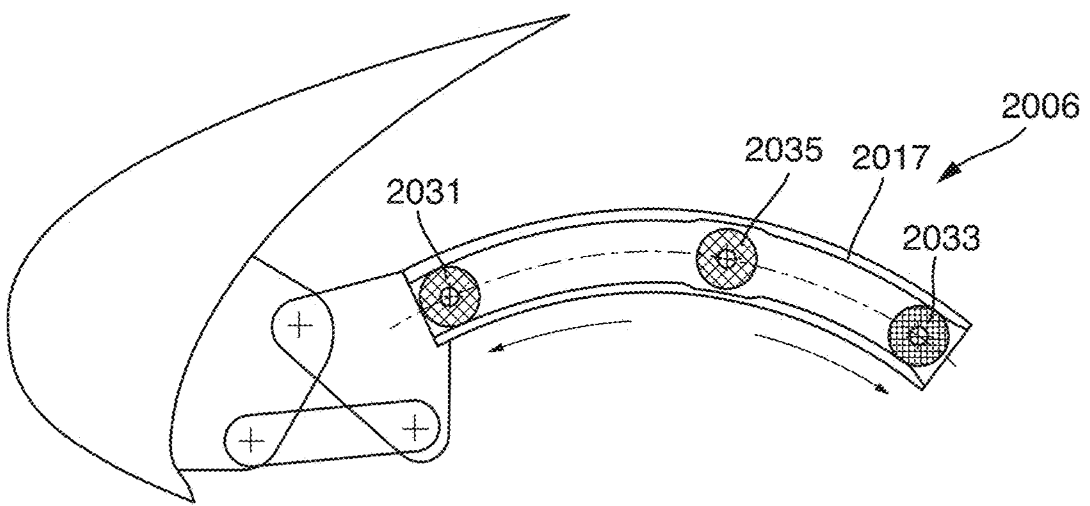
Figures 3, 4A, 4B:
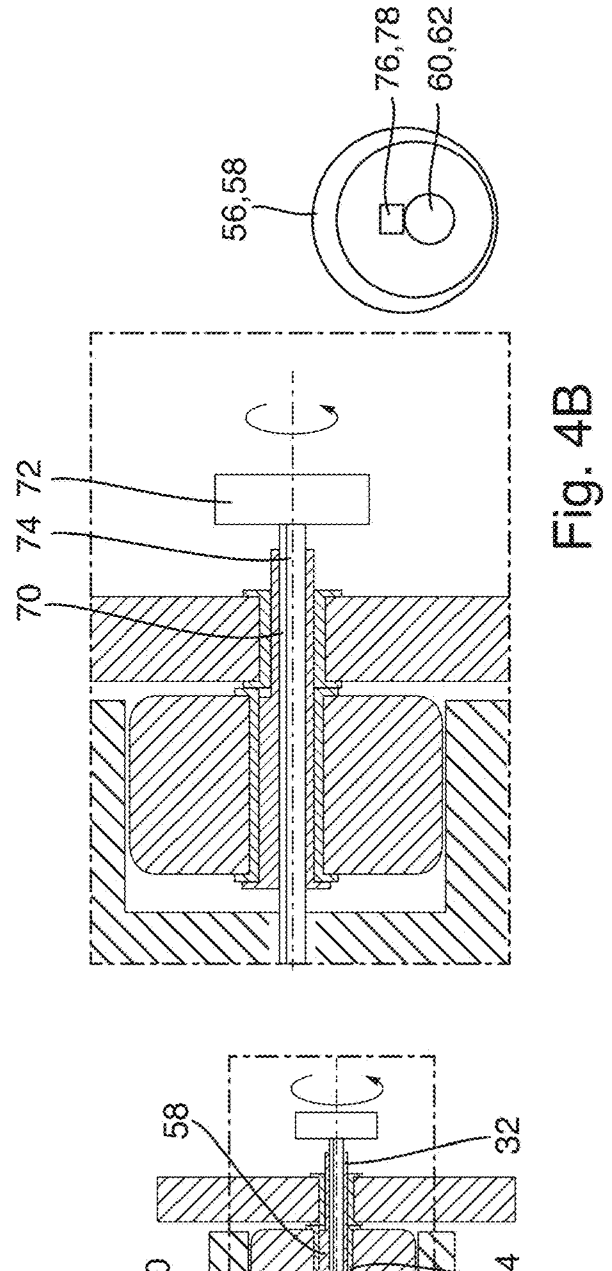
FIG. 3 is a lateral cross-section of a connection assembly according to the present disclosure.
FIGS. 4A and 4B is the lateral cross-section of FIG. 3 comprising an alignment member.

According to the prior art, the connection assembly 1006 comprises a slat track 1017 that extends along a track longitudinal axis 1019 between a front end 1021 and a rear end 1023 and has an intermediate portion 1025 between the front and rear ends 1021, 1023. The front end 1021 of the slat track 1017 is fixedly mounted to the slat 1007. The rear end 1023 and the intermediate portion 1025 of the slat track 1017 are movably mounted to the main wing 5 by a roller bearing 1027 such that the slat track 1017 is movable along the track longitudinal axis 1019. The roller bearing 1027 comprises a guide rail 1029 fixedly mounted to the main wing 5 and a first roller unit 1031 fixedly mounted to the rear end 1023 of the slat track 1017 and engaging the guide rail 1029. The roller bearing 1027 comprises a second roller unit 1033 that is fixedly mounted to the main wing 5 and that engages an engagement surface 1035 provided at the intermediate portion 1025 of the slat track 1017. As shown in FIGS. 3-5, the slat track 1017 has a profile comprising an upper flange portion 1039, a lower flange portion 1041 and at least one web portion 1043 connecting upper and lower flange portions 1039, 1041. The second roller unit 1033 is arranged in a recess 1045 between upper and lower flange portions 1039, 1041 and engages the engagement surface 1035 provided at the upper flange portion 1039 and at the lower flange portion 1041. FIG. 2B illustrates a different connection assembly 2006, also known in the art. This connection assembly 2006 comprises first, second and third rollers 2031, 2033, 2035, each of which are in contact with a track 2017.

FIG. 3 is a lateral cross-section of a connection assembly 9 according to the present disclosure, and as may be used in the wing of an aircraft, such as that described in relation to FIG. 1.

The connection assembly 9, in this example, movably connects a high lift body 12 (illustrated schematically in FIG. 3) to a main wing 14. The connection assembly 9 comprises an elongate track 16, which comprises a track longitudinal axis along which the track extends (similar to that illustrated in relation to FIGS. 2A and 2B) between a first and a second end, although in the example of FIG. 3, the track longitudinal axis extends in the direction into and out of the page. Although not illustrated in detail in FIG. 3, the elongate track 16 connects to the high lift body at an end or intermediate portion thereof. The connection assembly 9 may comprise features in common with that described in FIG. 2A and/or 2B. For example, a slat track (e.g. elongate track 16) and a guide rail may be present in the connection assembly of FIG. 3. In some other examples, there may be no guide rail and each (e.g. both) of the rollers of the roller bearing may be in contact with an engagement surface on the track. It should be noted, therefore, that the connection assembly of FIGS. 2A and 2B are just examples of a connection assembly, and that the connection assembly 9 of the present disclosure may take other forms.

The elongate track 16 is mounted to the main wing via a roller bearing so as to permit movement of the track 16 along the track longitudinal axis. The roller bearing, in this example, comprises at least one roller pair comprising a first and a second roller 18, 20. The first roller 18 rotates about a first roller rotation axis 22 and the second roller 20 rotates about a second roller rotation axis 24. The elongate track 16 comprises two flange portions 34, 36 connected together by a web 38. Each of the first and second rollers 18, 20 are configured to engage at least one engagement surface 40*a*, 40*b*, 42*a*, 42*b*, although in this example each roller 18, 20 may engage two engagement surfaces 40*a*, 40, 42*a*, 42*b*, although only one at any given time.

Each of the first and second rollers 18, 20 are mounted to a respective first and second eccentric connector assembly 26, 28. The first and second connector assemblies 26, 28 may be identical, or may be mirror images of one another. Each eccentric connector assembly 26, 28 comprises a mounting portion 30, 32 (see FIG. 4A) which is configured to engage (e.g. couple to) an object to which the eccentric connector assembly 26, 28 is mounted, which in this example is the main wing 14, although it is conceivable that the eccentric connector assemblies 26, 28 could be mounted to the track 16, in which case the flange portions 34, 36 and engagement surfaces 40*a*, 40*b*, 42*a*, 42*b* would be located on the main wing 14. Each eccentric connector assembly 26, 28 comprises a mounting sleeve 44, 46 which is in contact with the object to which the connector assembly 26, 28 is mounted, in this example the main wing 14. The mounting portion 30, 32 is substantially cylindrical in shape, and comprises a connector rotation axis 64, 66 about which the connector assembly 26, 28, or at least part thereof, may rotate as will be described in further detail in the following paragraphs.

Each connector assembly additionally comprises a bearing portion 48, 50 (see FIG. 4B) which is configured to engage (e.g. couple to) the corresponding roller 18, 20. Each eccentric connector assembly 26, 28 comprises a bearing sleeve 52, 54 which is in contact with the roller 18, 20 coupled thereto. Additionally, each eccentric connector assembly 26, 28 comprises an elongate connector 56, 58 with both the corresponding mounting sleeve 44, 46 and bearing sleeve 52, 54 located (e.g. mounted, fitted, or the like) thereon. Having a sleeve 44, 46, 52, 54 positioned between the connector 56, 58 and an item coupled thereto may facilitate rotation between the eccentric connector assemblies (or at least part thereof) and the object to which they are coupled, in this case either the rollers 18, 20 or the main wing 14. The sleeve 44, 46, 52, 54 may rotate with the elongate connector 56, 58, or may remain stationary as the elongate connector 56, 58 rotates relative thereto. Rotation of the mounting portion 30, 32 about the connector rotation axis 64, 66 may thus effect rotation of the entire eccentric connector assembly 26, 28 about the connector rotation axis 64, 66 (optionally excluding the mounting sleeve), which may enable rigging of the rollers 18, 20 of the roller bearing by enabling movement of the roller rotation axis 22, 24 relative to the elongate track 16.

The sleeve 44, 46, 52, 54 may comprise a low-friction material to facilitate rotation of the eccentric connector assemblies 26, 28.

The mounting portion 30, 32 illustrated in FIG. 3 has a smaller diameter than the bearing portion 48, 50. In this example, the difference in diameter is caused by a difference in diameter of the elongate connector 56, 58 of the mounting portion 30, 32 relative to the bearing portion 48, 50. However, in some examples the elongate connector 56, 58 may have a constant diameter along its length, and the difference in diameter may be as a result of a differing thickness of the mounting sleeve 44, 46 and the bearing sleeve 52, 54. For example, the mounting sleeve 44, 46 may have a lesser thickness than the bearing sleeve 52, 54 such that the mounting portion 30, 32 has a smaller diameter than the bearing portion 48, 50. Also in this example, the longitudinal axis of the elongate connector 56, 58 may be offset (e.g. parallel and offset) from the longitudinal axis of either the mounting sleeve 44, 46 (e.g. where the mounting portion 30, 32 has a greater diameter) or the bearing sleeve 52, 54 (e.g. where the bearing portion has a greater diameter) such that the connector rotation axis 64, 66 is offset from the roller rotation axis 22, 24.

Each of the connector assemblies 26, 28, (and in this example the elongate connector 56, 58 of the connector assemblies 26, 28) comprises a throughbore 60, 62. The longitudinal axis of the throughbore 60, 62 may be coaxial with one of the connector rotation axis 64, 66 and the roller rotation axis 22, 24.

Also illustrated in FIG. 3 is a passage 68 defined by the elongate track 16. In this example, the passage 68 is located in the elongate track 16 and is aligned with the longitudinal axis of the throughbore.

Shown in FIGS. 4A and 4B are the first and second eccentric connection assemblies 26, 28 being simultaneously engaged by an alignment member 70, in this example a single (e.g. common) alignment member 70. The alignment member 70 engages the throughbore 60, 62 of both eccentric connection assemblies 26, 28, and passes through the passage 68 defined in the elongate track 16. The alignment member 70 is in the form of an alignment key, and thus comprises a handle 72 and a shaft 74. The handle be rotated to rotate the connection assemblies 26, 28 about the connector rotation axis 64, 66, which may or may not be coaxial with the longitudinal axis of the throughbore and/or the alignment member 70. The alignment member 70 functions to both align the longitudinal axes of the throughbores, and thereby also the roller rotation axes 22, 24, as well as to ensure synchronous rotation of the first eccentric connector assembly 26 relative to the second 28 by rotation of the alignment member 70. In rotating the connection assemblies 26, 28 by rotating the alignment member 70 about the connector rotation axis 64, 66, the rollers 18, 20 may be rigged simultaneously relative to the track 16 in a precise and synchronous manner.

FIG. 4B additionally illustrates a lateral cross-section of the elongate connector 56, 58 of the connector assemblies 26, 28 which illustrates the throughbore 60, 62 therein. In this example, the illustrated throughbore 60, 62 comprises a longitudinally extending protrusion 76, 78 in both connector assemblies 26, 28. The alignment member 70 may also comprise a longitudinal protrusion extending along the shaft 74 thereof for engaging the protrusion 76, 78 so as to facilitate rotation of the connector assemblies 26, 28.

Figure 5A:
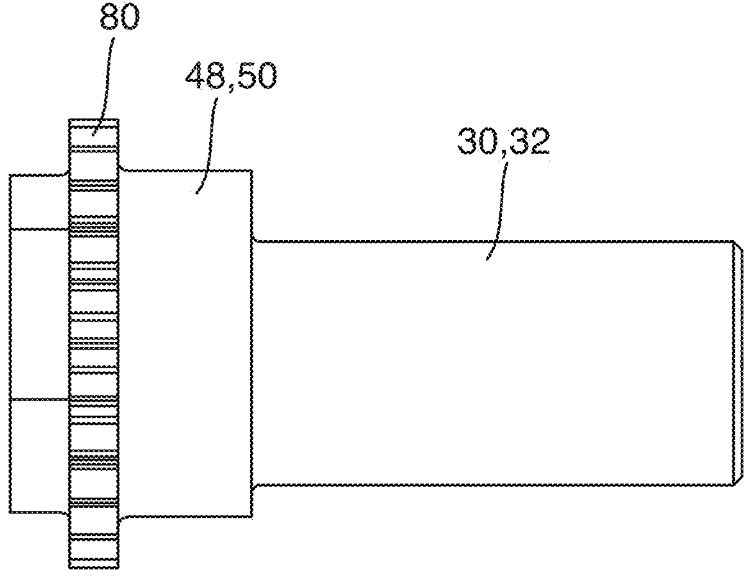
FIG. 5A is an elevation view of an eccentric connector assembly.
Figure 5B:
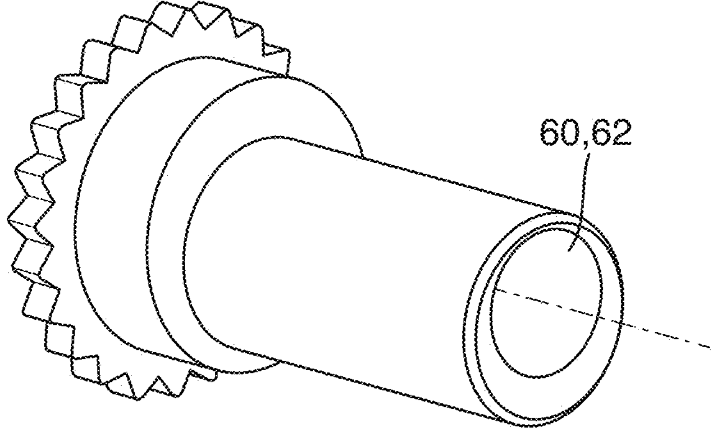
FIG. 5B is an isometric view of an eccentric connector assembly.

FIGS. 5A and 5B illustrate two views of an example of an eccentric connector assembly 26, 28, and in particular an elongate connector 56, 58 of the connector assemblies 26, 28. As can be seen, in this example the mounting portion 30, 32 has a smaller diameter than the bearing portion 48, 50. The bearing portion additionally comprises a roller retention means 80 which in this example is in the form of a flange of greater diameter than the bearing portion 48, although the skilled person will realise that any appropriate retention means may be used.

It should also be noted that, in this example, the throughbore 60, 62 may not be coaxial with either of the connector rotation axis 64, 66 or the roller rotation axis 22, 24, and in this example the throughbore 60, 62 does not comprise a longitudinal protrusion, as in the example of FIGS. 4A and 4B.

Although in the described example, the diameter of the mounting portion 30, 32 is smaller than that of the bearing portion 48, 50, it should be noted that examples are equally possible where the diameter of the mounting portion 30, 32 is greater than the bearing portion 48, 50, for example by providing an elongate connector 56, 58 having a greater diameter mounting portion 30, 32, or by providing a mounting sleeve 44, 46 with a greater thickness than the bearing sleeve 52, 54. In all cases, rotation of the eccentric connector assemblies 26, 28 has the effect of rotating the roller rotation axis 22, 24 about the connector rotation axis 64, 66, thereby rigging the roller 18, 20 relative to the track 14.

The invention claimed is:

1. A wing for an aircraft, comprising:

a main wing; and a high lift assembly comprising:

a high lift body, and a connection assembly movably connecting the high lift body to the main wing, such that the high lift body is movable between a retracted position and at least one extended position, wherein the connection assembly comprises an elongate track extending along a track longitudinal axis between a first end and a second end and has an intermediate portion between the first and second ends, wherein the first end and/or the intermediate portion of the track is mounted to the high lift body, wherein the track is mounted to the main wing via a roller bearing such that the track is movable along the track longitudinal axis, wherein the roller bearing comprises at least one roller pair comprising a first and a second roller, each of the first and second roller mounted to at least one of the main wing and the track via a respective first and second eccentric connector assembly, wherein the first and second eccentric connector assemblies are configured to be engaged simultaneously by a single alignment member for synchronous rigging of the first and second rollers.

2. The wing for an aircraft according to claim 1, wherein the first and second eccentric connector assemblies each comprises a respective first and second mounting portion for coupling to at least one of the main wing and the track and a respective first and second bearing portion for coupling to the respective first and second roller, wherein at least part of each mounting portion is rotatable about a respective first and second connector rotation axis relative to at least one of the main wing and the track, and each of the first and second roller is rotatable about a respective first and second roller rotation axis relative to the respective bearing portion, wherein each of the first and second connector rotation axis is offset from the respective roller rotation axis such that engagement and rotation, by the single alignment member, of the first and second mounting portions about the respective connector rotation axis effects corresponding rotation of the respective roller rotation axis about the connector rotation axis and synchronous rigging of the first and second rollers.

3. The wing for an aircraft according to claim 2, wherein the first and second connector assemblies each comprises an elongate connector, a mounting sleeve located on the elongate connector to define the mounting portion and a bearing sleeve located on the elongate connector to define the bearing portion, the mounting sleeve being axially offset along the elongate connector from the bearing sleeve.

4. The wing for an aircraft according to claim 3, wherein the length of elongate connector defining the mounting portion comprises a different diameter than the length of elongate connector defining the bearing portion.

5. The wing for an aircraft according to claim 3, wherein a thickness of the mounting sleeve is different than a thickness of the bearing sleeve such that the mounting portion has a different diameter to the bearing portion.

6. The wing of an aircraft according to claim 2, wherein each of the first and second connector rotation axes are parallel to and radially offset from the respective roller rotation axis.

7. The wing for an aircraft according to claim 1, wherein each of the first and second eccentric connector assemblies comprises a respective first and second throughbore, the first throughbore configurable to be aligned with the second throughbore such that the single alignment member is locatable within the first throughbore so as to extend therefrom and into the second throughbore.

8. The wing of an aircraft according to claim 2, wherein each of the first and second eccentric connector assemblies comprises a respective first and second throughbore, the first throughbore configurable to be aligned with the second throughbore such that the single alignment member is locatable within the first throughbore so as to extend therefrom and into the second throughbore, and wherein the throughbore is concentric with either the mounting portion or the bearing portion.

9. The wing of an aircraft according to claim 1, wherein the elongate track has an I-shaped, or double T-shaped, cross sectional shape.

10. An elongate track for a connection assembly of a wing according to claim 1, wherein the elongate track at least one of:

comprises a first and a second engagement surface configurable to engage a respective first and second surface of a first and second roller comprising a respective first and second eccentric connector assembly, or is configurable to mount a first and second roller comprising a first and second eccentric connector assembly thereto; and wherein the elongate track defines passage for permitting the single alignment member to simultaneously engage both the first eccentric connector assembly and the second eccentric connector assembly so as to enable synchronous rigging of the first and second rollers relative to the track.

11. The elongate track of claim 10, wherein the elongate track comprises two flanges connected by a web, and the passage is at least partially defined in the web.

12. A high lift assembly for the wing according to claim 1, the high lift assembly comprising a high lift body, and a connection assembly configurable to movably connect the high lift body to a main wing of an aircraft, such that the high lift body is movable between a retracted position and at least one extended position, wherein the connection assembly comprises an elongate track, extending along a track longitudinal axis between a first end and a second end and has an intermediate portion between the first and second ends, wherein the first end and/or the intermediate portion of the track is mounted to the high lift body, wherein the track is configurable to be mounted to a main wing of an aircraft via a roller bearing such that the track is movable along the track longitudinal axis, wherein the roller bearing comprises at least one roller pair comprising a first and a second roller, each of the first and second roller being configurable to be mounted to at least one of the main wing and the track via a respective first and second eccentric connector assembly, wherein the first and second eccentric connector assemblies are configured to be engaged simultaneously by a single alignment member for synchronous rigging of the first and second rollers.

13. A roller bearing rigging system for a wing according to claim 1, comprising:

a first and second eccentric connector assembly configurable to mount a roller to at least one of the main wing of an aircraft and the track of the connection assembly, wherein the first and second eccentric connector assemblies are configured to be engaged simultaneously be the single alignment member for synchronous rigging of the first and second rollers.

14. A method for rigging a high lift assembly of the wing of an aircraft, comprising:

providing a wing for an aircraft according to claim 1, simultaneously engaging the single alignment member with both the first and the second eccentric connector assemblies;

synchronously rotating the first connection assembly and the second connection assembly to rig the roller bearing relative to the elongate track.

15. An aircraft comprising a wing according to claim 1.

16. An aircraft comprising an elongate track according to claim 10.

17. An aircraft comprising a high lift assembly according to claim 12.

18. An aircraft comprising a roller bearing rigging system according to claim 13.

19. The wing for an aircraft according to claim 1, wherein the elongate track comprises a web, and wherein the first roller and the second roller are positioned on opposing sides of the web.

20. A wing for an aircraft, comprising:

a main wing; and a high lift assembly comprising:

a high lift body, and a connection assembly movably connecting the high lift body to the main wing, such that the high lift body is movable between a retracted position and at least one extended position, wherein the connection assembly comprises an elongate track extending along a track longitudinal axis between a first end and a second end and has an intermediate portion between the first and second ends, wherein the first end and/or the intermediate portion of the track is mounted to the high lift body, wherein the track is mounted to the main wing via a roller bearing such that the track is movable along the track longitudinal axis, wherein the roller bearing comprises at least one roller pair comprising a first and a second roller, each of the first and second roller mounted to at least one of the main wing and the track via a respective first and second eccentric connector assembly, wherein the first and second eccentric connector assemblies are configured to be engaged simultaneously by a single alignment member for synchronous rigging of the first and second rollers, wherein the first and second eccentric connector assemblies each comprises a respective first and second mounting portion for coupling to at least one of the main wing and the track and a respective first and second bearing portion for coupling to the respective first and second roller, wherein at least part of each mounting portion is rotatable about a respective first and second connector rotation axis relative to at least one of the main wing and the track, and each of the first and second roller is rotatable about a respective first and second roller rotation axis relative to the respective bearing portion, wherein each of the first and second connector rotation axis is offset from the respective roller rotation axis such that engagement and rotation, by the single alignment member, of the first and second mounting portions about the respective connector rotation axis effects corresponding rotation of the respective roller rotation axis about the connector rotation axis and synchronous rigging of the first and second rollers, and wherein the first and second connector assemblies each comprises an elongate connector, a mounting sleeve located on the elongate connector to define the mounting portion and a bearing sleeve located on the elongate connector to define the bearing portion, the mounting sleeve being axially offset along the elongate connector from the bearing sleeve.

* * * * *